W. E. C. Coxe.
Making Railroad Piles.
Nº 95,199. Patented Sept. 28, 1869.

Witnesses:
Wm. A. Steel.
John Parker.

Inventor:
W. E. C. Coxe
by his attorney
H. Howson

United States Patent Office.

W. E. C. COXE, OF READING, PENNSYLVANIA.

Letters Patent No. 95,199, dated September 28, 1869.

---

IMPROVED METHOD OF CONSTRUCTING PILES FOR RAILROAD-RAILS.

---

The Schedule referred to in these Letters Patent and making part of the same.

---

*To all whom it may concern:*

Be it known that I, W. E. C. COXE, of Reading, Berks county, Pennsylvania, have invented an Improved Pile for Steel-Faced Railroad-Rails; and I do hereby declare the following to be a full, clear, and exact description of the same.

My invention consists of a pile, the upper portion of which is composed of narrow and broad bars of steel, arranged alternately side by side, and on edge, and combined with iron bars, all substantially as described hereafter, so that a thorough union of the steel and iron may be effected.

In order to enable others skilled in the art to practise my invention, I will now proceed to describe the mode of carrying the same into effect, reference being had to the accompanying drawing, which forms a part of this specification, and in which—

Figure 1:
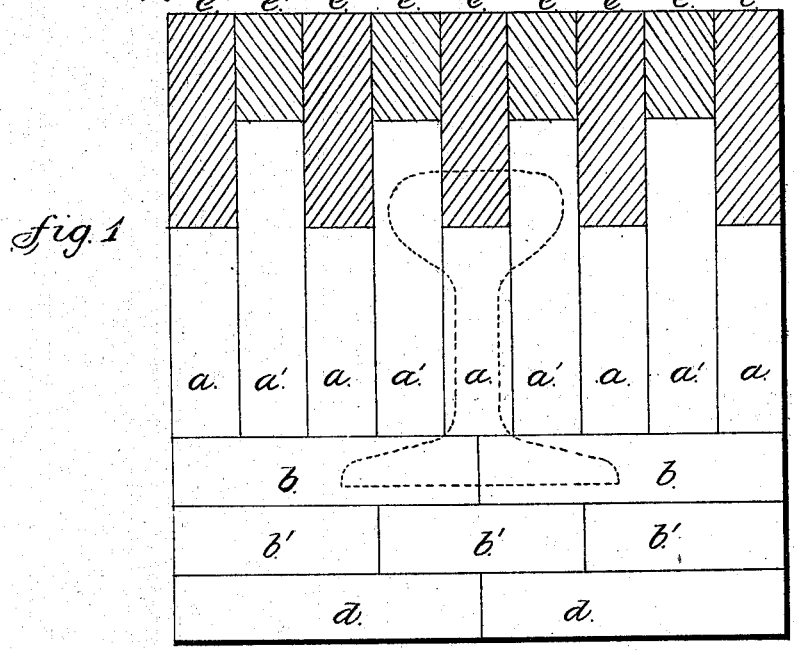

Figure 1 is a transverse section of my improved pile for steel-faced rails, and

Figure 2:
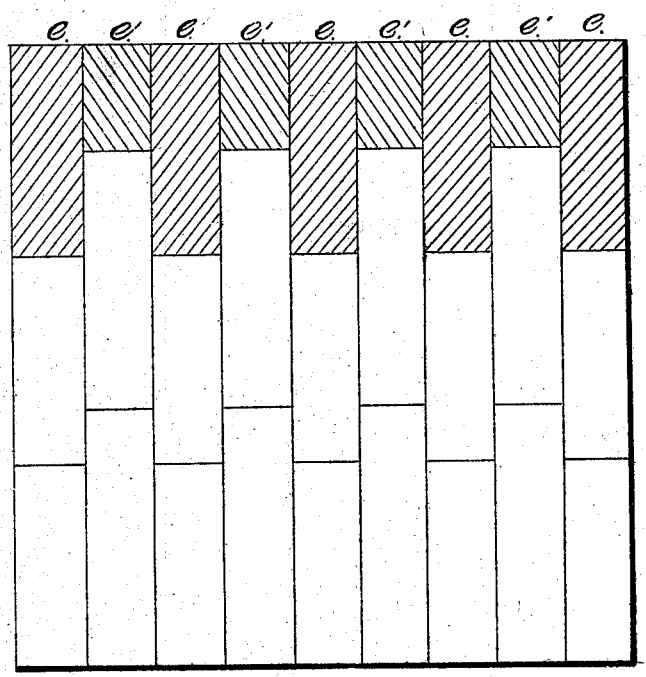

Figure 2 a section of a modified pile.

In fig. 1, the base of the pile is composed of three layers of iron bars, placed flatwise, two bars, *d d*, forming the bottom layer, three bars, *b' b' b'*, the next layer, and two bars, *b b*, the third layer, the joints between the bars of the several layers being arranged as indicated in the drawing.

Above the base of the pile thus formed, is arranged side by side, on edge, a series of iron bars, *a* and *a'*, broad and narrow bars being placed alternately, as clearly shown in the drawing, and above these are arranged alternately, broad and narrow bars *e* and *e'*, of steel, the lower edges of the broad steel bars resting on the upper edges of the narrow iron bars *a*, and the narrow steel bars resting on the broad iron bars *a'*, so that the whole of the bars which are of the same thickness throughout, will form a compact square pile, ready for conversion into the steel-faced rail, shown by dotted lines in fig. 1, by the usual process of rolling.

All the bars in the modified pile shown in fig. 2, are arranged on edge, care being taken, however, to carry out the plan illustrated in the pile, fig. 1, of arranging broad and narrow steel bars alternately side by side, for by this plan a more thorough junction of the steel with the iron is effected than if the steel bars were all one width, for in this case, or if the steel portion of the pile consisted of a single flat bar, the line of junction of the steel with the iron would be straight, and this straight junction would be maintained in the finished rail, the steel portion of which would be apt to separate from the iron portion; whereas, by causing some of the steel bars to project further into the iron portion of the pile than others, this evil is obviated, and a more thorough union of the steel with the iron is effected, as will be readily understood without further explanation.

Without limiting myself to any specific arrangement of the bars which compose the iron portion of the pile,

I claim as my invention, and desire to secure by Letters Patent—

Constructing the upper portion of the pile of broad and narrow steel bars, arranged alternately on edge, and side by side, and combining them with iron bars, substantially as and for the purpose herein set forth.

In testimony whereof, I have signed my name to this specification, in the presence of two subscribing witnesses.

W. E. C. COXE.

Witnesses:
 JOHN WHITE,
 HARRY SMITH.